United States Patent [19]

Ball

[11] 4,119,163
[45] Oct. 10, 1978

[54] CURB CLIMBING WHEEL CHAIR

[76] Inventor: Douglas Ball, 58 Pacific Ave., Senneville, Quebec, Canada, H9X 1A9

[21] Appl. No.: 839,033

[22] Filed: Oct. 3, 1977

[51] Int. Cl.² .......................... B62D 61/12; B62D 5/02
[52] U.S. Cl. .................... 180/6.5; 180/8 A;
 180/16; 180/24.02; 180/24.12; 180/DIG. 3;
 280/5.28; 297/DIG. 4
[58] Field of Search ........ 280/5.2, 5.22, 5.28,
 280/5.32; 180/6.5, 8 A, 16, 24.02, 24.12, DIG.
 3; 297/DIG. 4

[56] References Cited

U.S. PATENT DOCUMENTS

| 1,119,002 | 12/1914 | Uhervocz | 280/5.28 |
|---|---|---|---|
| 1,200,379 | 10/1916 | Lunsford | 180/DIG. 3 |
| 2,751,027 | 6/1956 | McLaughlin | 280/5.22 X |
| 2,931,449 | 4/1960 | King | 180/8 A |
| 3,104,112 | 9/1963 | Crail | 280/5.28 X |
| 3,703,216 | 11/1972 | Thibodeau | 180/24.02 X |
| 3,807,520 | 4/1974 | Chisholm | 180/6.5 |

FOREIGN PATENT DOCUMENTS

| 1,013,246 | 7/1977 | Canada. | |
| 1,555,448 | 8/1969 | Fed. Rep. of Germany | 280/5.2 |

Primary Examiner—John P. Silverstrim
Attorney, Agent, or Firm—Larson, Taylor and Hinds

[57] ABSTRACT

A self-propelled wheel-chair capable of climbing up or down a curb is disclosed. The wheel-chair is able to elevate an occupant higher than existing types of wheel-chairs practically to the height of a person standing. The wheel-chair has a seat assembly mounted on a frame, a first pair of drive wheels on a horizontal fixed axis supporting the frame, each of the first pair positioned on either side and below the seat assembly, two independent driving means, one for forward and backward rotation of each of the first pair of drive wheels, a second pair of wheels on a common axis parallel to the horizontal fixed axis, the second pair of wheels having drive connecting means with adjacent first pair of drive wheels such that one of the two independent driving means drives one of the first pair of drive wheels, and, through the drive connecting means, one of the second pair of drive wheels, a pair of link arms located one on each side of the seat assembly, each of the pair of link arms pivotally mounted from the frame and supporting one of the second pair of drive wheels on the common axis, pivoting means for pivoting the pair of link arms together, and a support means attached to the frame in front and below the seat assembly.

11 Claims, 22 Drawing Figures

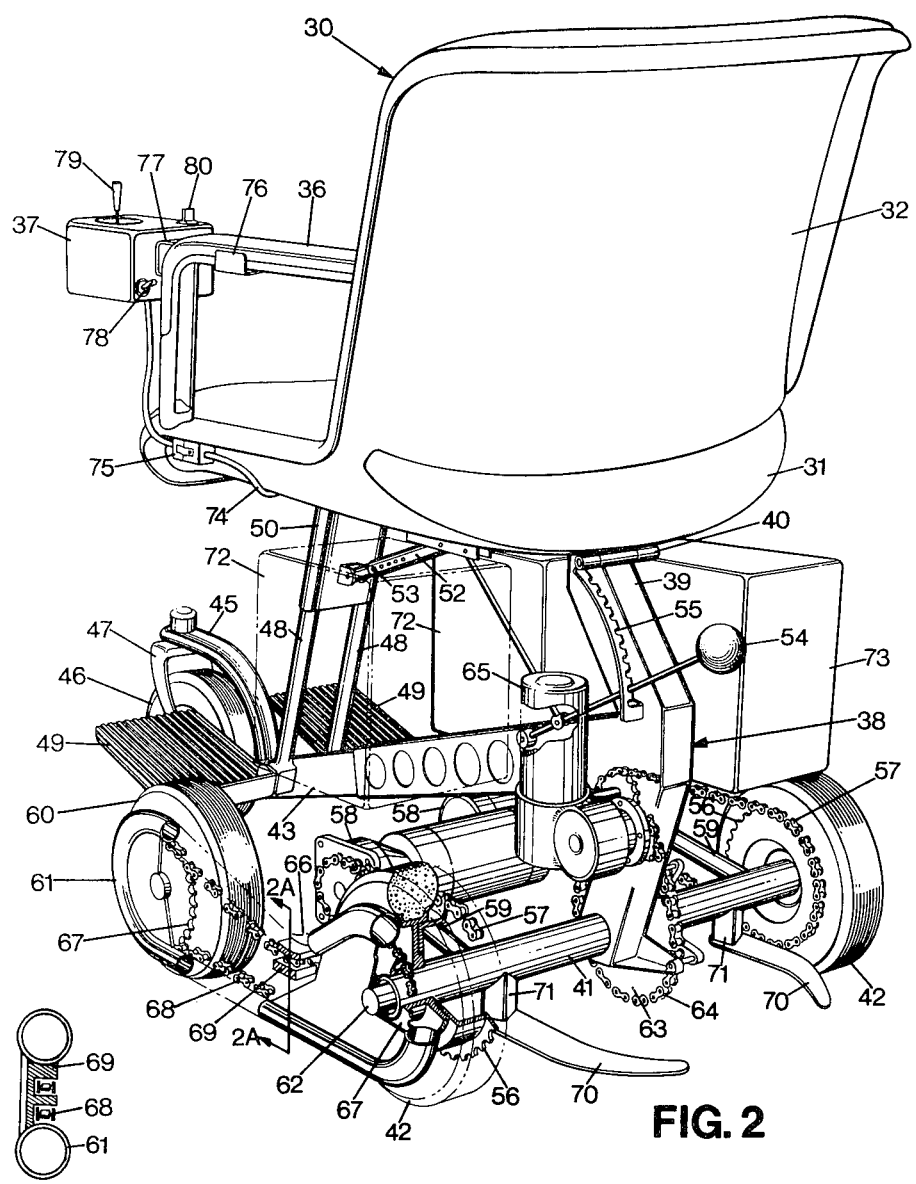
FIG. 2
FIG. 2A
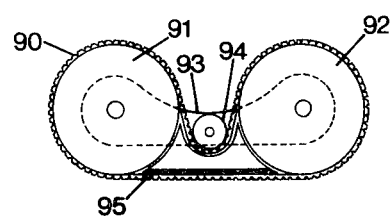
FIG. 21

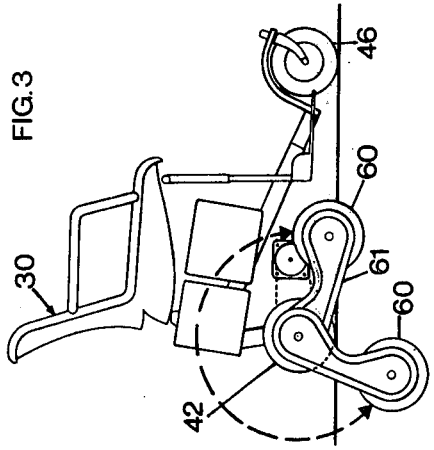
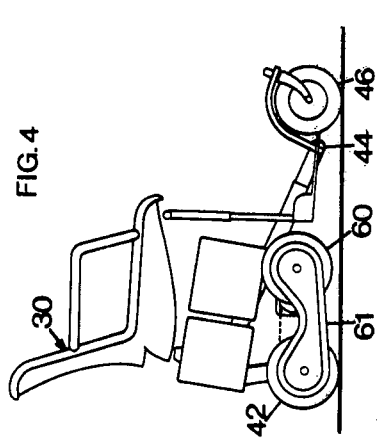
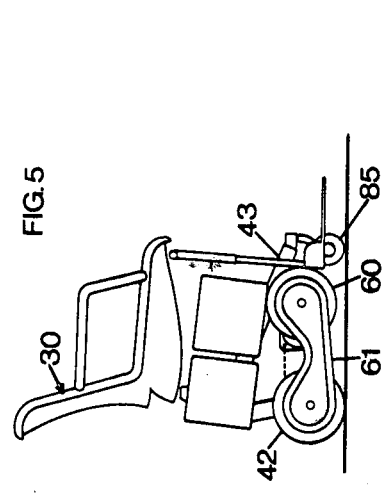
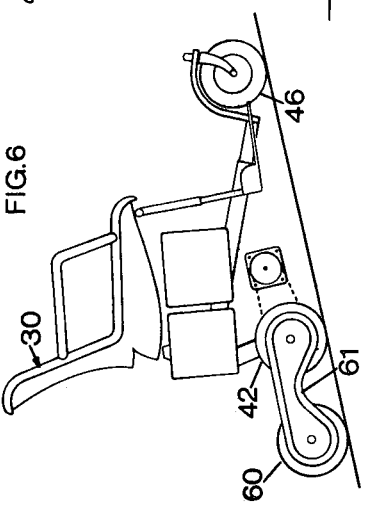
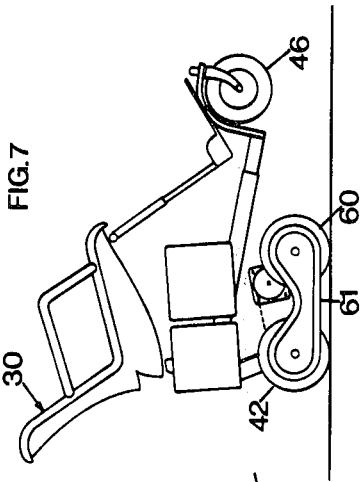
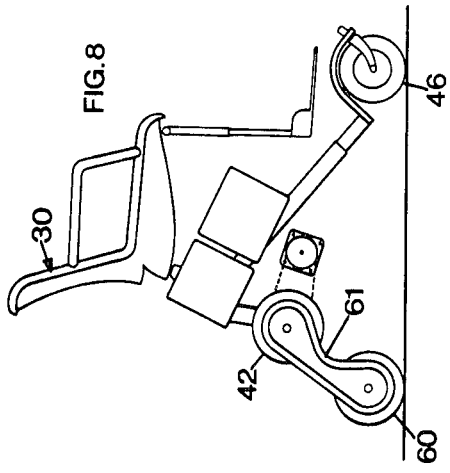

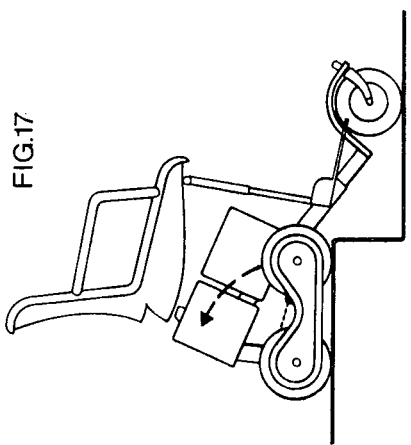
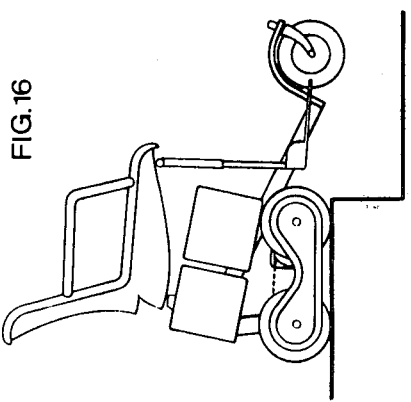
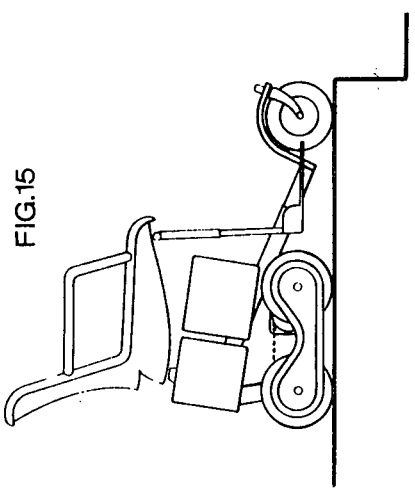
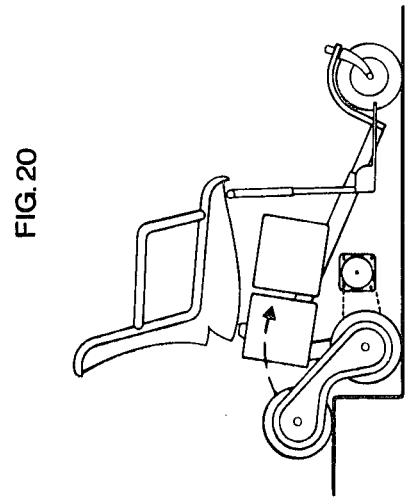
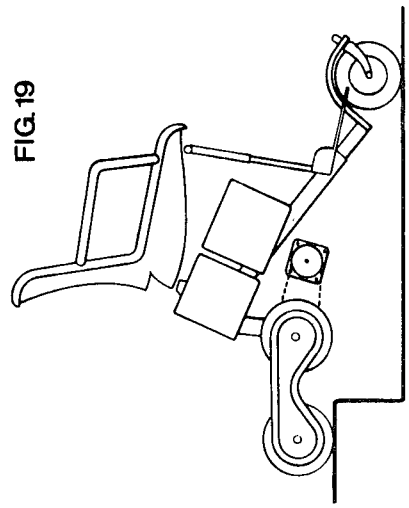
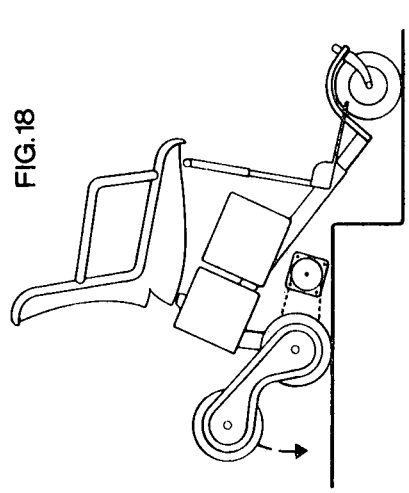

CURB CLIMBING WHEEL CHAIR

This invention relates to a wheel-chair for the disabled and more particularly to a self-propelled wheel-chair to climb up or down a curb and suitable for raising the occupant above the normal seated position.

Self-propelled wheel-chairs powered by electric motors are known. Some of these wheel-chairs even have devices for climbing curbs and the like. One example of such a wheel-chair is shown in my previous Canadian Pat. No. 1,013,246 which issued July 5, 1977.

Accordingly, it is a purpose of the present invention to provide an improved self-propelled wheel-chair of the type capable of climbing up and down curbs or steps and being able to elevate the chair occupant up to a sufficient height for the occupant to either answer a public telephone or press the button for a desired floor number on an elevator control panel.

Further purposes of the present invention is to provide a self-propelled wheel-chair which may have either two or four wheel drive, is narrower than the normal wheel-chair having two large diameter wheels, so the present chair has access through narrow doorways and the like, and may be either folded or separated into two halves for storage in the trunk of a car.

With these and other purposes in mind, there is provided a self-propelled wheel-chair comprising in combination, a seat assembly mounted on a frame, a first pair of drive wheels on a horizontal fixed axis supporting the frame, each of the first pair positioned on either side and below the seat assembly, two independent driving means, one for forward and backward rotation of each of the first pair of drive wheels, a second pair of wheels on a common axis parallel to the horizontal fixed axis, the second pair of wheels having drive connecting means with adjacent first pair of drive wheels such that one of the two independent driving means drives one of the first pair of drive wheels, and, through the drive connecting means, one of the second pair of drive wheels, a pair of link arms located one on each side of the seat assembly, each of the pair of link arms pivotally mounted from the frame and supporting one of the second pair of drive wheels on the common axis, pivoting means for pivoting the pair of link arms together, and a support means attached to the frame in front and below the seat assembly.

In further embodiments of the present invention, the link arms pivot on the fixed axis, the support means is at least one free swivelling castor wheel, the pivoting means for pivoting the pair of link arms has a movement range from a front position approximately 30° below the horizontal to a rear position approximately 75° below the horizontal. The two independent driving means and the pivoting means comprise individual electric motors and gear reducers powered from a battery source located on the frame, and a control panel adjacent an arm rest on the seat assembly having a means to control the operation and direction of rotation of the electric motors. The seat assembly itself is pivotally mounted on the frame and includes inclining means for positioning the seat assembly at a plurality of inclined positions on the frame. In yet another embodiment, the first pair and second pair of driving wheels are connected by endless belt tracks on either side.

The advantage of this invention both as to its construction and mode of operation will be readily appreciated as the same becomes better understood by reference to the following detailed description when considered in connection with the accompanying drawings which illustrate embodiments of the invention.

FIG. 2 is a perspective back view of the wheel-chair shown in FIG. 1 with partial cut-out sections to enable the construction and operating functions of the wheel-chair to be more clearly seen.

FIG. 2A shows a cross-sectional detail taken at line 2A—2A of FIG. 2.

FIGS. 3 to 8 show a series of side views of the wheel-chair of FIGS. 1 and 2 in different positions.

FIGS. 15 to 20 show a sequence of side views illustrating the wheel-chair of FIGS. 1 and 2 descending a curb.

FIG. 21 on the second page of drawings shows a partial diagrammatic side elevation of a belt drive embodiment for the wheel-chair.

Figure 1:
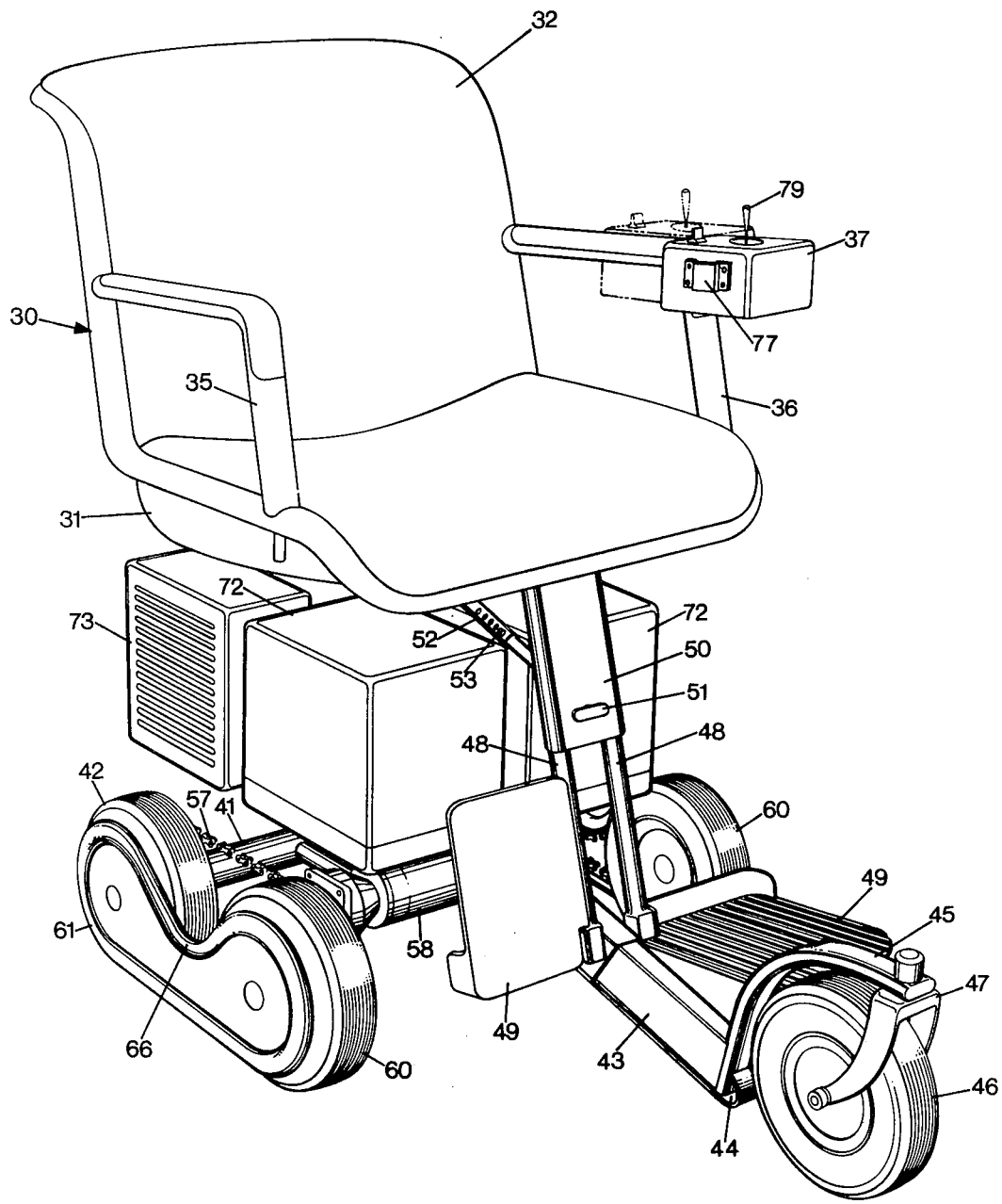
FIG. 1 is a perspective front view showing one embodiment of the wheel-chair of the present invention.

Referring now to the drawings, FIGS. 1 and 2 illustrate a wheel-chair having a seat assembly 30 with a molded seat 31 integrally connected to a molded back rest 32. A removable arm rest 35 is provided on the right hand side of the seat assembly 30. The arm rest is removable to enable a paraplegic patient to get in or out of the wheel-chair. The left-hand arm rest 36 has a control panel 37 mounted thereon.

The seat assembly 30 rests on a frame 38 which comprises a main vertical strut 39 extending downwards from a hinge 40 at the base of the seat assembly 30 of a horizontal fixed tube 41 which represents the axis of a first pair of driving wheels 42. Extending forward from the center of the main strut 39 and sloping downwards is a telescoping arm 43 having a curved skid 44 at its extremity. A curved bracket 45 is attached to the end of the arm 43 directly above the curved skid 44. A front castor wheel 46 is mounted in a fork 47 freely pivoting from a location on top of the curved bracket 45.

Extending from beneath the front edge of the seat assembly 30 are two telescoping arms 48, side by side and parallel, terminating in foot rests 49. Each foot rest 49 may be independently pivoted about its rear so that it folds flush with the arms 48. Between the telescoping arms 48 and the seat assembly 30, attached to the frame 38, is a hollow section 50 having a clamp 51 thereon so that the extension arms 48 and hence the foot rests 49 can be adjusted to the desired height. The heights of the two foot rests 49 do not necessarily have to be the same, but can be adjusted to suit the occupant. Furthermore, the hollow section 50 is connected to frame 38 by a tubular arm 52 and a spring loaded locating pin 53 fitting in one of a plurality of holes in the arm 52 which allows the angle of the telescoping arms 48 to be adjusted as desired. The inclination of the seat assembly 30 is controlled by a handle 54 located adjacent the main strut 39, and having a series of slots 55 in a bracket attached to the main strut 39 into which the handle 54 may be positioned to select the desired inclination of the seat assembly 30 on the main frame 38. The seat assembly 30 pivots about the hinge 40 allowing the handle 54 to be positioned in the selected slot 55.

The main drive wheels 42 rotate on the axial tube 41 and are driven by sprockets 56 and chain 57 from individual electric gear motors 58 mounted on tubular struts 59 which in turn are connected to the main frame 38 specifically the axial tube 41. One gear motor 58 drives one main drive wheel 42. A second pair of drive wheels 60 are positioned in line from the first pair of drive wheels 42. The second pair of drive wheels 60 are connected to a link arm 61 which is pivoted on the axis of the main drive wheels 42 connected to a shaft 62 passing through the center of the axial tube 41. The link arm shaft 62 is driven by sprockets 63 and chain 64 from an electric gear motor 65. The shaft 62 is rigidly connected to the links 61 on both sides thus when the gear motor 65 is operated, the link arms raise or lower the pair of second drive wheels 60 together. Each link arm 61 has a recess 66 on one side which prevents the link arm 61 striking against the edge of a curb when the wheelchair is used to climb or descend a curb. The main drive wheels 42 and second drive wheels 60 each have an outside sprocket 67 connected thereto which in turn has a chain 68 connecting the outside sprockets 67 on the main drive wheel 42 and second drive wheel 60 on the same side thus driving the second drive wheel 60. A rubbing pad 69 is provided as shown in FIG. 2A at the recess 66 of the link arm 61 so that the chain 68 follows the contour of the link arm 61 and does not extend above the recess 66 in the link arm 61.

Rear skids 70 are located behind the main frame 38 to prevent the wheel-chair tipping backwards. Rear skids 70 are preferably made from spring steel thus absorb shock when going down a curb. The rear skids 70 are connected to lugs 71 which in turn are rigidly connected to the axial tube 41. The rear skids 70 may be swung inwards pivoting about the lugs 71 when the wheel-chair is to be stored away or transported in order to save space.

Two 12-volt car batteries 72 mounted on the main frame 38 directly under the front of the seat assembly 30 provide the power source to the three electric gear motors 58, 65. The controls for the motors are in a control box 73 behind the batteries 72 and a cable 74 from the control box 73 leads through a special disconnect 75 to the control panel 37. The control panel 37 has two mounting positions. A first position in front of the arm rest 36 and a second position at the side of the arm rest 36. The control panel 37 is mounted by means of a clip 76 attached to the arm rest which fits into a socket 77 attached to the control panel 37. The control panel 37 has a master switch 78 on the side which overrides all the other switches on the panel 37. A central toggle or joystick 79 operates the two drive gear motors 58. The link arm gear motor 65 is operated by a toggle switch 80.

In one embodiment, the seat assembly 30 with the exception of the hollow section 50 and extension arms 48 supporting the foot rests 49 may be completely removed from the main frame 38. If this occurs, the disconnect 75 is uncoupled so that the control panel 37 remains with the seat assembly and the cable 74 to the control box 73 stays with the main frame 38. Special handles (not shown) may be provided so that a person may be lifted in the seat assembly 30 leaving the main frame 38, power source and drive assembly. The seat assembly may then be installed on a convenient support while the main frame unit is moved independently. The main frame, power source and drive assembly weigh in the order of 100 to 150 pounds, thus, it is more convenient to move the seat assembly 30 separately from the main frame unit. Furthermore, if the wheel-chair is to be transported by car or some other means, it is more convenient to divide the wheel-chair into a seat assembly and a frame unit so that the two portions can fit into the trunk of a car.

An occupant sitting in the seat assembly 30 can change the inclination of the seat assembly by moving the handle 54 into a different notch 55 on the main frame 38. Once the master switch 78 on the control panel 37 is in the "on" position, it is only necessary for the occupant to push the joystick 79 forward in order to activate both main drive gear motors 58 and to move the wheel-chair forward. If the joystick is pushed to one side then one motor 58 drives forward and one motor 58 drives backwards so the wheel-chair rotates on its own axis. If the joystick 79 is moved backwards, both main drive gear motors 58 power the wheels backwards. The speed of the main drive gear motors 58 and hence the wheel-chair is controlled by the movement of the joystick 79. A small movement of the stick operates the motors at slow speed, but if the joystick 79 is pushed to its extremity, then the maximum speed of the gear motors 58 is obtained. In a forward direction the wheel-chair can move at speeds which can be in a range of from two to five miles an hour. The drive system comprising the control panel with the joystick, control box, batteries and gear motors are presently available on the market today to fit onto a standard large diameter wheel-chair.

The operation of the link arm motor 65 is by means of the toggle switch 80. A forward movement of the toggle switch 80 activates the link arm gear motor to push the two link arms 61 downwards so the second drive wheel 60 touches the ground and the front castor wheel 46 is raised off the ground. Thus, the wheel-chair now rests on the two main drive wheels and the two second drive wheels. When the toggle switch 80 is pulled backwards the link arms 61 rotate about the axial tube 41 until the second drive wheels 60 touch the ground behind the main drive wheels 42 so it rests on the two second drive wheels 60 and the front castor wheel 46.

FIG. 3 is an illustration of the wheel-chair showing the complete movement of the link arms 61. The link arms 61 move the second drive wheels 60 forwards and downwards to a position approximately 30° below horizontal in front of the main drive wheels 42. In the other direction, the link arms 61 move the second drive wheels 60 backwards and downwards behind the main drive wheels 42 to a position approximately 75° below the horizontal. Limit switches are provided to prevent the link arms movement beyond these positions inasmuch as the wheel-chair would then become unstable and could tip the occupant onto the ground.

Normal running position of the chair is shown in FIG. 4 with the second drive wheels 60 in front of the main drive wheels 42 and raised just above the ground so the main drive wheels 42 support the wheel-chair. In this position, the wheel-chair is stable and easily maneuvered by means of the individual drive motors controlling the main drive wheels 42. The castor wheel 46 swivels to follow the direction the wheel-chair is driven in. In another embodiment illustrated in FIG. 5, the castor wheel 46 is removed and replaced with a small castor wheel 85 which is positioned not to extend beyond the front of the seat assembly 30. In this configuration, the chair can approach much closer to vertical surfaces such as walls, counters and the like, and is not restricted by the larger castor wheel 46 used in the normal running position shown in FIG. 4. The wheel-chair configuration with the small castor wheel 85 shown in FIG. 5 is suitable for indoor use but is not sufficiently stable for use on rough ground. When the wheel-chair is used in this configuration the control panel 37 may be moved from the position in front of the arm rest 36 to a position at the side of the arm rest 36 so that it does not protrude beyond the front of the chair assembly 30. The small castor wheel 85 may be moved out on the telescoping arm 43 when the wheel-chair is placed in the raised position for stability.

In FIG. 6 the wheel-chair is shown in a position for climbing a ramp or incline. Both the main drive wheels 42 and the second drive wheels 60 are resting on the ground with the second drive wheels 60 behind the main drive wheels 42. You thus have a four wheel drive situation and a more stable position for the wheel-chair when climbing inclines or travelling over rough ground as the secondary drive wheels 60 are behind the wheel-chair and ensure increased stability to prevent the wheel-chair tipping backwards. This provides improved traction on soil and prevents sinking into soft ground as the weight of the wheel-chair is spread over four wheels instead of two. Maneuverability is not quite so good in this position because the wheel base length from the second drive wheels 60 to the castor wheel 46 is greater. FIG. 7 shows another configuration of the wheel-chair with the castor wheel 46 raised off the ground and the weight of the wheel-chair taken by the main drive wheels 42 and second drive wheels 60. This configuration provides improved traction because there is four drive wheels resting on the ground. This extra traction is particularly useful on slippery surfaces. It can be used only when rearward stability such as that shown in FIG. 6 is not required. In another configuration, the castor wheel 46 may be lowered to the ground so that there are five wheels touching the ground. This configuration is suitable for rough ground.

FIG. 8 shows the wheel-chair in the maximum raised position with the weight of the wheel-chair being borne by the second drive wheels 60 and the castor wheel 46. The inclination of the seat assembly 30 has been adjusted to the desired position. The occupant in the wheel-chair is raised approximately ten inches above the normal running position shown in FIG. 4. In another embodiment the method of adjusting the inclination of the seat assembly 30 is by an electric motor geared to a tilting device operated from another toggle switch on the control panel 37. The range of inclination for the seat assembly 30 may be as much as 30° but in the case of a powered movement limit switches are provided at both ends of the range.

Figures 9, 10, 11, 12, 13, 14:
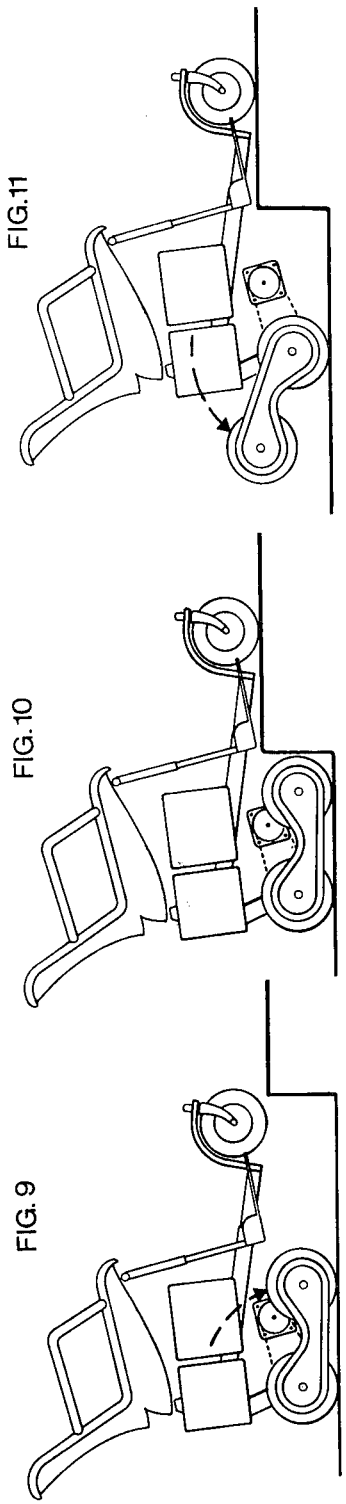
FIGS. 9 to 14 show a sequence of side views illustrating the wheel-chair of FIGS. 1 and 2 climbing a curb.

The method of climbing a curb is illustrated in FIGS. 9 to 14. The occupant of the wheel-chair initially proceeds in the normal running position such as that shown in FIG. 4. The driver then lowers the link arms 61 so that the second drive wheels 60 touch the ground and raise the castor wheel 46 to a position as shown in FIG. 9. In this position the wheel-chair approaches the curb until the castor wheel 46 passes over the curb. The castor wheel 46 is then lowered by raising the link arms 60 so that the castor wheel 46 rests on the top surface of the curb as shown in FIG. 10. The rotation of the link arms 61 continues until the second drive wheels 60 are behind the main drive wheels 40 as shown in FIG. 11. The second drive wheels 60 touch the ground and raise the wheel-chair to a position as shown in FIG. 12. The wheel-chair then proceeds forward until the main drive wheels 42 are over the edge of the curb and the occupant then proceeds to raise the link arms 61 thus lowering the wheel-chair so that the main drive wheels 42 rest on the top surface of the curb as shown in FIG. 13. The rotation of the link arms 61 is continued as shown in FIG. 14 until the wheel-chair is brought to the normal running position as shown in FIG. 4.

One method of descending a curb is shown in FIGS. 15 to 20. The wheel-chair initially approaches the curb and lowers the link arms 61 so the second drive wheels 60 rest on the ground as shown in FIG. 15. The wheel-chair then proceeds forwards until the castor wheel 46 projects over the curb as shown in FIG. 16. The occupant then slowly raises the link arms 61 so that the wheel-chair tips forward until the castor wheel 46 touches the ground below the curb to a position shown in FIG. 17. The rotation of the link arms 61 continue as shown in FIG. 18. Then when the second drive wheels 60 touch the ground behind the main drive wheels 42, the wheel-chair proceeds slowly forward until the main drive wheels 42 are beyond the curb, and the wheel-chair is only supported by the second drive wheels 60 as shown in FIG. 19. The occupant then slowly raises the link arms 61 so that the wheel-chair is slowly lowered until the main drive wheels 42 touch the ground adjacent the edge of the curb as shown in FIG. 20. The link arms 61 are rotated forward until the normal running position as shown in FIG. 4 is reached. It will be appreciated that the recess 66 in the link arms 61 is desirable to avoid the link arms 61 touching the edge of the curb both in the climbing and descending step.

A quick method of descending a curb is to place the chair into the position shown in FIG. 11 with the second drive wheels 60 behind the main drive wheels 42 and approximately four inches above the ground. The wheel-chair is allowed to slide or bump down the curb on the front skid 44 below the telescoping arm 43. The rear skids 70 and the second drive wheels 60 absorb the shock when the main drive wheels 42 go over the edge of the curb. No harm can come to the chair by descending a curb in this manner, but in some cases the jolt may be uncomfortable or undesirable for the wheel-chair occupant.

The wheel-chair may also be used for ascending and descending on escalators. The width of the wheel-chair is sufficiently narrow so that it fits in even the narrowest commercial escalator. When ascending, the second drive wheels 60 are lowered behind the main drive wheels 42 and the seat is tilted forward. When descending, the wheel-chair is placed in the normal running position as shown in FIG. 4, but the seat is tilted backwards. The weight of the chair is on the main drive wheels 42 and front castor 46 or the front skid 44. Alternatively, the corner of an escalator step may support the link arms 61 depending on the position of the wheel-chair on the escalator. In any location on the escalator, the wheel-chair has no tendency to roll forward or backward when ascending or descending. In both movements it is preferred that the wheel-chair occupant have full use of arms to hold the hand rails.

In another embodiment shown in FIG. 21, a belt drive 90 is shown between two drive wheels 91, 92 positioned at each end of a link arm 93. The belt 90 has a rubber tread and preferably a rib at its centre to prevent it slipping sideways off the wheels 91 and 92 when the wheel-chair turns. An idler sprocket 94 is positioned between the wheels 91 and 92 so that the link arm 93 still retains a notch for climbing curbs. The drive means may include a chain adjacent the wheels or alternatively the belt 90 itself. A low friction support 95 supported from the link arm 93 provides support for the belt track and spreads the weight of the wheel-chair and occupant over a larger ground area.

In one embodiment the overall width of the wheelchair is twenty-three inches and the length is approximately 37 inches. The main frame is 18 inches high when in the lowest position and without the seat. The occupant can raise the seat assembly lowering the link arms to the furthest backwards position. The width of the wheel-chair is considerably less than wheel-chairs having two large diameter wheels, because the smaller wheels of the present wheel-chair can be positioned beneath the seat assembly, and do not have to extend upwards at the sides of the seat assembly.

It will be apparent to those skilled in the art that various changes may be made to the scope of the present invention without limiting it in any way. For instance, the single castor wheel 46 shown in front could be replaced by two wheels, the chain drive means between the gear motors and the wheels or link arms could be replaced with a V-belt drive, shaft drive with appropriate level gearing, or even a simple gear drive. A hydraulic operating system could be employed to replace the electrical control system, the hydraulic source would be a single hydraulic pump operated by an electric motor powered by a battery source. The wheel-chair may be made foldable so that the arm rests are removable and the back folded down on the seat. Other changes may be made by those skilled in the art without departing from the scope of the present invention which is only limited by the claims.

The embodiments of the invention in which an exclusive property or privilege is claimed are defined as follows:

1. A self-propelled wheel-chair comprising in combination,
   a seat assembly mounted on a frame,
   a first pair of drive wheels on a horizontal fixed axis supporting the frame, each of the first pair positioned on either side and below the seat assembly,
   two independent driving means, one for forward and backward rotation of each of the first pair of drive wheels,
   a second pair of wheels on a common axis parallel to the horizontal fixed axis, the second pair of wheels having drive connecting means with adjacent first pair of drive wheels such that one of the two independent driving means drives one of the first pair of drive wheels, and, through the drive connecting means, one of the second pair of drive wheels,
   a pair of link arms located one on each side of the seat assembly, each of the pair of link arms pivotally mounted from the frame about said fixed axis and supporting one of the second pair of drive wheels on the common axis,
   power means for pivoting the pair of link arms together through a movement range of greater than 180°,
   and a support means attached to the frame in front and below the seat assembly.

2. The self-propelled wheel-chair according to claim 1 including endless belt tracks joining each of the first pair and second pair of wheels on each side.

3. The self-propelled wheel-chair according to claim 1 wherein the support means is at least one free-swiveling castor wheel.

4. The self-propelled wheel-chair according to claim 1 wherein the movement range extends from a front position approximately 30° below the horizontal to a rear position approximately 75° below the horizontal.

5. The self-propelled wheel-chair according to claim 3 wherein the castor wheel is mounted at the end of a telescoping arm supported from the frame.

6. The self-propelled wheel-chair according to claim 5 wherein the castor wheel is replaceable by a small castor wheel directly below the front of the seat assembly.

7. The self-propelled wheel-chair according to claim 1 wherein the two independent driving means and the power means comprise individual electric motors and gear reducers powered from a battery source located on the frame, and including a control panel adjacent an arm rest on the seat assembly having means to control the operation and direction of rotation of the electric motors.

8. The self-propelled wheel-chair according to claim 1 wherein the seat assembly is pivotally mounted on the frame and including inclining means for positioning the seat assembly at a plurality of inclined positions on the frame.

9. The self-propelled wheel-chair according to claim 8 wherein the inclining means includes an electric motor and gear reducer powered from a battery source.

10. The self-propelled wheel-chair according to claim 1 including two foot rests each located on a telescoping strut extending from the seat assembly, the telescoping strut being adjustable in length and being pivotally connected to the seat assembly adjustable for inclination.

11. The self-propelled wheel-chair according to claim 1 wherein the seat assembly is removable from the frame.

* * * * *